(12) United States Patent
Ruppe et al.

(10) Patent No.: US 7,169,425 B2
(45) Date of Patent: Jan. 30, 2007

(54) SIZE EXCLUSION CHROMATOGRAPHY PROCESS FOR THE PREPARATION OF AN IMPROVED SOY PROTEIN-CONTAINING COMPOSITION

(75) Inventors: Scott Ruppe, High Ridge, MO (US); Theodore C. Busch, St. Louis, MO (US); Houston Smith, St. Louis, MO (US)

(73) Assignee: Solae, LLC, St. Louis, MO (US)

( * ) Notice: Subject to any disclaimer, the term of this patent is extended or adjusted under 35 U.S.C. 154(b) by 0 days.

(21) Appl. No.: 10/943,714

(22) Filed: Sep. 17, 2004

(65) Prior Publication Data
US 2006/0062878 A1  Mar. 23, 2006

(51) Int. Cl.
  *A23J 3/16*  (2006.01)
(52) U.S. Cl. ............ 426/422; 426/656; 426/634; 426/487; 426/488; 426/495
(58) Field of Classification Search ............ 426/634, 426/656, 422, 487, 488, 495
See application file for complete search history.

(56) References Cited

U.S. PATENT DOCUMENTS

| 4,551,274 A | 11/1985 | Shen .................. 260/123.5 |
| 4,687,814 A | 8/1987 | Chaumont et al. ......... 525/242 |
| 5,077,062 A | 12/1991 | Ernster ..................... 426/46 |
| 5,190,658 A | 3/1993 | Vilenchik et al. ........... 210/656 |
| 5,514,655 A | 5/1996 | DeWille et al. .............. 514/21 |
| 5,840,858 A | 11/1998 | Smith et al. ................. 530/413 |
| 6,288,216 B1 | 9/2001 | Hultin et al. ............... 530/412 |
| 6,355,816 B1 | 3/2002 | Dobbins ..................... 554/14 |
| 6,423,364 B1 | 7/2002 | Altemueller et al. ........ 426/634 |
| 6,451,975 B1 | 9/2002 | Hultin et al. ............... 530/350 |
| 6,551,512 B1 | 4/2003 | Britsch et al. .............. 210/635 |
| 6,602,928 B1 | 8/2003 | Takahashi et al. .......... 521/150 |
| 6,803,068 B1* | 10/2004 | Monagle et al. ............ 426/656 |
| 2001/0031701 A1 | 10/2001 | Shimbo et al. ............. 502/402 |
| 2002/0041938 A1 | 4/2002 | Takahashi et al. .......... 428/34.1 |
| 2002/0052006 A1 | 5/2002 | Dunayevskiy et al. ....... 435/7.1 |
| 2004/0013791 A1* | 1/2004 | Singh .......................... 426/629 |

OTHER PUBLICATIONS

STN Database Abstract. AN 134:2255 CA. "Plant Protein Hydrolysates . . ." Biotechnology Progress. Published 2000. vol. 16, No. 5, pp. 688-692.*

Sephadex Spin Column Webpage. http://www.islandsci.com/multspin2.htm.*

Tessek Ltd. Catalog Webpage. http://www.tessek.com/cat4.htm.*

Franek et al. Plant Protein Hydrolysates. Biotechnology Progress, 2000 vol. 16. pp. 688-692.*

(Continued)

*Primary Examiner*—Anthony Weier
(74) *Attorney, Agent, or Firm*—James L. Cordek; Holly M. Amjad; Cary A. Levitt

(57) ABSTRACT

Relatively low molecular weight components which contribute undesirable flavor, odor, appearance, functionality, and/or other characteristics to soy protein materials may be removed, in accordance with the present invention, by treating the materials with a size exclusion resin selective for removal of the low molecular weight components.

33 Claims, 1 Drawing Sheet

OTHER PUBLICATIONS

Journal of Chromatography, 599 (1992) pp. 25-33, "Biosep-SEC-S high-performance size-Exclusion Chromatographic Columns for Proteins and Peptides" by Faizy Ahmed and Bijan Modrek.

Biochemical and Biophysical Research Communications, vol. 99, No. 3, Apr. 15, 1981, pp. 1020-1027, "Preparative High Speed Gel Permeation Chromatography of Proteins on Toyopearl HW55F" by John Germershausen and John d. Karkas.

Journal of Agricultural Food Chemistry, vol. 42, (1994), pp. 2713-2720, "Size Exclusion Chromatography of Soybean Proteins and Isoflavones" by Kenneth D. Cole and Sydney L. Cousin, Jr.

Agr. Biol. Chem., vol. 27, No. 12, (1963) pp. 878-880, "Fractionation of Soybean Proteins by Gel Filtration" by Kiyozo Hasegawa, Takanori Kusano, and Hisateru Mitsuda.

Agr. Biol. Chem., vol. 33, No. 2, (1969) pp. 281-284, Distribution of the 7S Proteins in Soybean Globulins by Gel Filtration with Sephadex G-200 by Ikunori Koshiyama.

Journal of Chromatography B, vol. 770, (2002), pp. 261-273, "Fractionation of Phosphorus and Trace Elements Species in Soybean Fluor and Common White Bean Seeds by Size Exclusion Chromatography-Inductively Coupled Plasma Mass Spectrometry" by Richard Koplfk, Hana Pavelková, Jana Cincibuchová, Oto Mestek, František Kvasni ka, Miloslav Suchánek.

* cited by examiner

SIZE EXCLUSION CHROMATOGRAPHY PROCESS FOR THE PREPARATION OF AN IMPROVED SOY PROTEIN-CONTAINING COMPOSITION

FIELD OF THE INVENTION

The present invention relates to a process for improving the flavor, odor, appearance, functionality, and/or other characteristics of soy protein-containing compositions.

BACKGROUND OF THE INVENTION

Plant protein materials are used as functional food ingredients, and have numerous applications in enhancing desirable characteristics in food products. Soy protein materials, in particular, have seen extensive use as functional food ingredients. Soy protein materials are used as an emulsifier in meats, including frankfurters, sausages, bologna, ground and minced meats and meat patties, to bind the meat and give the meat a good texture and a firm bite. Another common application for soy protein materials as functional food ingredients is in creamed soups, gravies, and yogurts where the soy protein material acts as a thickening agent and provides a creamy viscosity to the food product. Soy protein materials are also used as functional food ingredients in numerous other food products such as dips, dairy products, tuna, breads, cakes, macaroni, confections, whipped toppings, baked goods and many other applications.

In general, soy protein materials include soy flakes, soy flour, soy grits, soy meal, soy protein concentrates, soy protein isolates, and mixtures thereof. The primary difference between these soy protein materials is the degree of refinement relative to whole soybeans. Soy flakes are generally produced by dehulling, defatting, and grinding the soybean and typically contain less than 65 wt. % soy protein on a moisture-free basis. Soy flakes also contain soluble carbohydrates, insoluble carbohydrates such as soy fiber, and fat inherent in soy. Soy flakes may be defatted, for example, by extraction with hexane. Soy flours, soy grits, and soy meals are produced from soy flakes by comminuting the flakes in grinding and milling equipment such as a hammer mill or an air jet mill to a desired particle size. The comminuted materials are typically heat treated with dry heat or steamed with moist heat to "toast" the ground flakes and inactivate anti-nutritional elements present in soy such as trypsin inhibitors. Heat treating the ground flakes in the presence of significant amounts of water is avoided to prevent denaturation of the soy protein in the material and to avoid costs involved in the addition and removal of water from the soy material. The resulting ground, heat treated material is a soy flour, soy grit, or a soy meal, depending on the average particle size of the material. Soy flour generally has a particle size of less than 150 µm. Soy grits generally have a particle size of 150 to 1000 µm. Soy meal generally has a particle size of greater than 1000 µm.

Soy protein concentrates typically contain 65 wt. % to 90 wt. % soy protein, with the major non-protein component being fiber. Soy protein concentrates are typically formed from defatted soy flakes by washing the flakes with either an aqueous alcohol solution or an acidic aqueous solution to remove the soluble carbohydrates from the protein and fiber. On a commercial scale, considerable costs are incurred with the handling and disposing of the resulting waste stream.

Soy protein isolates, more highly refined soy protein materials, are processed to contain at least 90% soy protein and little or no soluble carbohydrates or fiber. Soy protein isolates are typically formed by extracting soy protein and water soluble carbohydrates from defatted soy flakes or soy flour with an alkaline aqueous extractant. The aqueous extract, along with the soluble protein and soluble carbohydrates, is separated from materials that are insoluble in the extract, mainly fiber. The extract is typically then treated with an acid to adjust the pH of the extract to the isoelectric point of the protein to precipitate the protein from the extract. The precipitated protein is separated from the extract, which retains the soluble carbohydrates, and is dried after being adjusted to a neutral pH or is dried without any pH adjustment. On a commercial scale, these steps contribute significant cost to the product.

In addition to the soy protein content, flavor, odor, and color of a soy protein material are also a relevant criteria for the selection of a soy protein material as a functional food ingredient. Conventional soy protein material may have a strong beany, bitter flavor and odor as a result of the presence of certain volatile compounds (e.g., hexanal, diacetyl, pentanal, n-pentane and octanal) and/or an undesired appearance due to the presence of other relatively low molecular weight compounds (e.g., isoflavones) in the soy protein material.

SUMMARY OF THE INVENTION

Among the various aspects of the present invention, therefore, is the provision of a process for improving the flavor, odor, appearance, functionality, and/or other characteristics of a soy protein-containing composition.

Briefly, therefore, one aspect of the present invention is a process for improving the flavor, odor, or appearance of a food-grade, soy protein-containing composition, the process comprising feeding a food-grade, soy protein-containing material to a chromatographic separation zone, the chromatographic separation zone comprising a bed of size exclusion resin, the resin having a size exclusion limit; passing the food-grade soy protein-containing material through the bed of size exclusion resin to reduce the concentration of components having a molecular weight less than the size exclusion limit of the resin in the food-grade material to form a reduced component concentration soy protein-containing material; and eluting the reduced component concentration soy protein-containing material from the chromatographic separation zone after it has passed through the bed of size exclusion resin.

The present invention is further directed to a process for improving the flavor, odor, or appearance of a food-grade, soy protein-containing composition, the process comprising feeding a soy protein-containing material to a chromatographic separation zone, the soy protein-containing material comprising at least two soy proteins having a molecular weight of at least 50,000 daltons, the chromatographic separation zone comprising a bed of size exclusion resin having a size exclusion limit of S, wherein S is no more than 50,000 daltons, whereby components of the soy protein material having a molecular weight less than S are retained by the resin and components having a molecular weight greater than S are not retained by the resin. The process further comprises passing the soy protein-containing material through the bed of size exclusion resin to reduce the concentration of components having a molecular weight less than the size exclusion limit of the resin in the soy protein-containing material to form a reduced component concentration soy protein material, and eluting the reduced component concentration soy protein material from the chromatographic separation zone after it has passed through the bed of size exclusion resin wherein the weight ratio of any two soy proteins having a molecular weight of at least 50,000 daltons in the eluted composition is within 20% of the weight ratio of the same two soy proteins in the feed soy protein-containing material.

Other objects and features of this invention will be in part apparent and in part pointed out hereinafter.

DETAILED DESCRIPTION OF THE PREFERRED EMBODIMENTS

Figure 1:
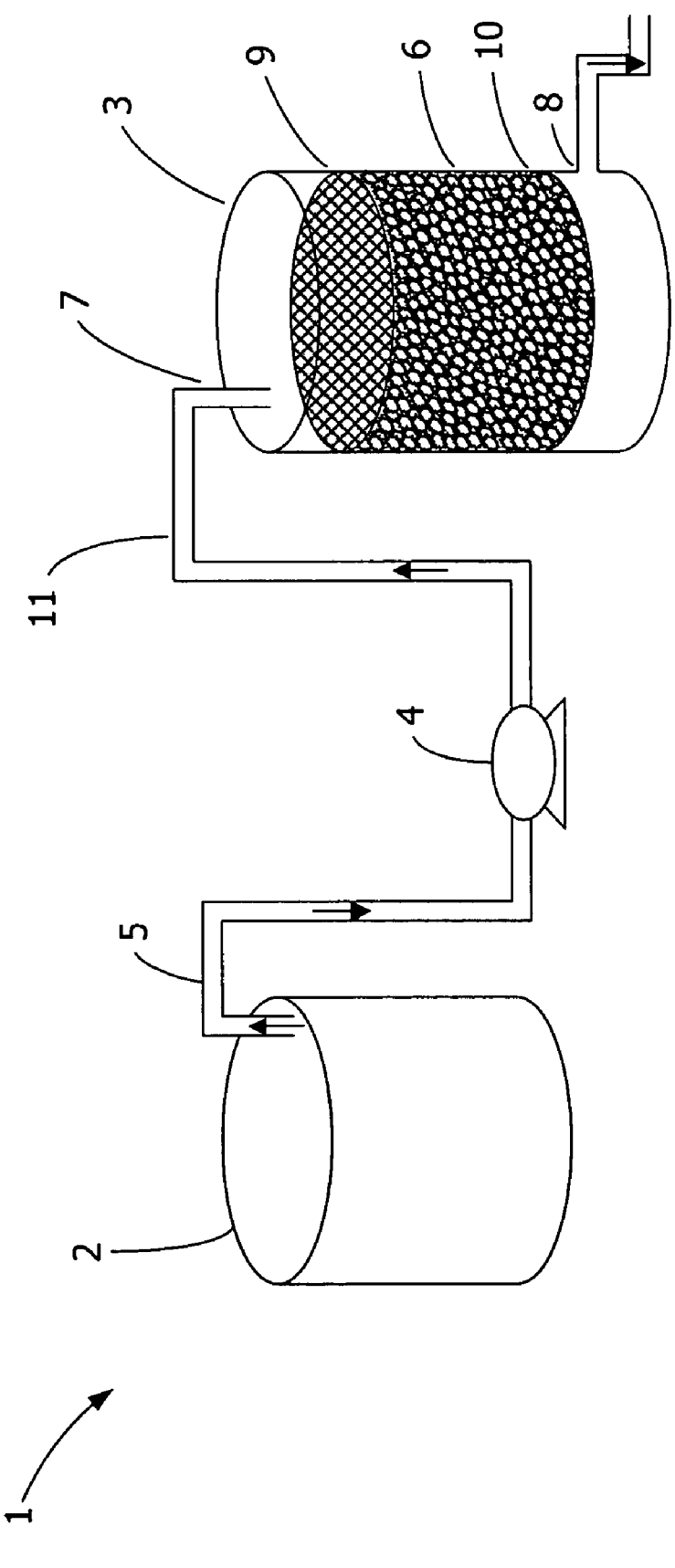
FIG. 1 schematically depicts an apparatus suitable for use in accordance with the process of the present invention.

Relatively low molecular weight components which contribute undesirable flavor, odor, appearance (e.g., color), and/or other characteristics (e.g., inducing intestinal gas and flatulence in humans) to soy protein materials may be removed, in accordance with the present invention, by treating the materials with a size exclusion resin selective for the relatively low molecular weight components in a column. In general, these low molecular weight components include volatile and nonvolatile components having a molecular weight of at least 80 daltons and, typically, having a molecular weight in the range of from 80 daltons to 17,000 daltons, or from 1000 daltons to 17,000 daltons. The volatile components contributing to undesired flavor and odor of soy protein materials include, for example, 3-methyl butanal, 2-methyl butanal, pentanal, dimethyl disulfide, hexanal, heptanal, 2,5-octanedione, 1-octen-3-ol, 2-octanone, 2-pentyl furan, 3-octen-2-one, 3,5-octadien-2-one, 2-nonanone, nonanal, and other compounds identified in Table 1. The nonvolatile components contributing to undesired flavor and color of soy protein materials include, for example, isoflavones. Such isoflavones include, for example, the daidzein, genistein, and glycitein isoflavones. Exemplary daidzein isoflavones include 6-OMal-daidzin and 6-OAc-daidzin. Exemplary genistein isoflavones include 6-OMal-genistin and 6-OAc-genistin. Glycitein isoflavones include 6-OMal-glycitin. The nonvolatile components contributing to inducing intestinal gas and flatulence in humans include, for example, fructose, glucose, sucrose, maltose, lactose, stachyose, and raffinose.

Soy protein materials to be treated in accordance with the present invention may be derived from soy plants whether wild-type, hybrid, or genetically modified by recombinant techniques. Alternatively, the material may be derived from other plant species which have been genetically modified to express a protein naturally expressed by a wild-type soy plant.

The soy protein-containing composition generally comprises an admixture of a soy protein material and an aqueous medium. The soy protein material may be, for example, in the form of soy flakes, soy flour, soy grits, soy meal, a soy protein concentrate, or a soy protein isolate. Generally, the soy protein-containing composition in the feed stream is in the form of a mixture comprising a soy protein material suspended, solubilized, or otherwise dispersed in an aqueous medium. The aqueous medium may comprise water, an alcohol (e.g., ethanol), or an organic solvent. In one embodiment, the soy protein-containing composition is in the form of a dispersion in which the soy protein material is distributed throughout the aqueous medium and, prior to treatment with the size exclusion resin, the dispersion is subjected to an ultrafiltration operation to produce a soy protein-containing composition in the form of a solution.

Soy flakes, soy flour, soy grits, soy meal, soy protein concentrates, and soy protein isolates generally contain differing concentrations of soy protein. For example, soy flakes, soy flour, soy grits, and soy meal typically contain no more than 65% by weight protein on a moisture-free basis and, more typically, from 45 to 65% by weight protein on a moisture-free basis. Soy protein concentrates typically contain at least 65% by weight protein on a moisture-free basis and, more typically, from 65 to 90% by weight protein on a moisture-free basis. Soy protein isolate typically contains at least 90% by weight protein on a moisture-free basis and, more typically, from 90 to 95% by weight protein on a moisture-free basis. Depending upon the nature of the soy protein-containing composition in the feed stream, therefore, the process of the present invention may be used to enhance the flavor, odor or appearance of a soy protein material having at least 45% by weight protein on a moisture-free basis. The amount of protein in soy protein material may be ascertained, for example, by the Nitrogen-Ammonia-Protein Modified Kjeldahl Method of A.O.C.S. (American Oil Chemists Society) Official Methods Bc 4-91(1997), Aa 5-91(1997), or Ba 4d-90(1997).

Naturally occurring soy proteins are generally globular proteins having a hydrophobic core surrounded by a hydrophilic shell. Numerous soy proteins have been identified including, for example, storage proteins such as glycinin and β-congylcinin, trypsin inhibitors such as the Bowman-Birk inhibitor and the Kunitz inhibitor, and hemagglutinins such as lectin. These proteins have varying molecular weights which, generally, range from 8,000 to 650,000 daltons. Of course, the soy plant may be transformed to produce other proteins not naturally expressed by soy plants. These recombinantly expressed proteins will also generally have a range of molecular weights. Typically, therefore, soy protein-containing compositions comprise a mixture of at least two soy proteins whether native or recombinant having a molecular weight of at least 50,000 daltons.

The process of the present invention comprises feeding a food-grade soy protein-containing composition (i.e., the composition does not contain a component that is toxic or otherwise biologically hazardous) to a chromatographic separation zone which includes a bed of a size exclusion resin comprising porous particles and having a size exclusion limit. The food-grade soy protein-containing composition is passed through the resin to reduce the concentration of components in the food-grade soy protein-containing composition having a molecular weight less than the size exclusion limit of the resin to form a treated soy protein-containing composition. After passing through the bed of size exclusion resin, treated soy protein-containing composition is eluted from the chromatographic zone.

The soy protein-containing composition feed material may be the product or offstream from another operation or process, such as the preparation of soy flakes, soy flour, soy grits, soy meal, soy protein concentrates, or soy protein isolates. In general, however, the feed stream preferably contains no more than 20% by weight solids and, more preferably, no more than 15% by weight solids. Typically, the composition contains from 5 to 20% by weight solids and, more typically, from 10 to 15% by weight solids. The solids present in the soy protein-containing composition to be treated generally include soy fiber and fat components.

In certain embodiments, it may be preferred to remove most if not all of the solid components present in the feed composition prior to treatment to reduce the risk of column fouling. The composition may be subjected to one or more pre-treatment operations including, for example, filtration or centrifuging. The particle size of the undesired solids present in the composition typically range up to 20 to 25 µm. Typically, filtration of the soy protein-containing composition prior to treatment comprises passing the composition through a filter medium, thus, in certain embodiments, the filter medium used for filtration of the soy protein-containing composition has a particle retention of between 20 and 25 µm. Typically, the filter medium is constructed of chemically resistant materials including, for example, stainless steel, plastic, and ceramic. Suitable commercial filters include a No. 4 Whatman manufactured by Whatman Inc. (Clifton, N.J.). In the case of a soy protein-containing composition containing a soy protein material less refined than a soy protein isolate (i.e., soy flakes, soy flour, soy grits, soy meal, and soy protein concentrates), it may be preferred to subject the composition to centrifuging to remove undesired particulate solids. The conditions of a centrifuging operation vary depending on numerous factors including, for example, the solids content of the soy protein-containing composition and the desired solids content of the treated soy protein-containing composition. Typically, the soy protein-containing composition is centrifuged for at least 20 minutes per kg of solids present in the composition and the centrifuging operation typically reaches at least 2600 revolutions per minute (rpm).

As shown in FIG. 1, the soy protein-containing composition may be treated by the present process using apparatus 1. Soy protein-containing composition to be treated is transferred from a source, such as a feed reservoir 2 to column 3 by means of a pump 4 and piping 5. In column 3, the soy protein-containing composition contacts a bed of chromatographic material containing a size exclusion resin 6 selective for removal of low molecular weight components from the composition.

Generally, the column 3 includes an inlet 7, an outlet 8, and filters 9 and 10. The inlet 7 to the column is in fluid flow communication with pump 4 and piping 5, including feed tube 11, to supply the composition to column 3. Treated soy protein-containing composition exits column 3 after passing though filter 10 and column outlet 8. Column outlet 8 is in fluid flow communication with suitable means for collection of treated soy protein-containing composition or further treatment.

The soy protein-containing composition may be fed to the inlet 7 of column 3 by any suitable means including, for example, a pump 4 in fluid flow communication with feed reservoir 2 or may be gravity fed to the column. The type of pump used to introduce the composition to the inlet of the column is not narrowly critical however it preferably provides a highly stable, precisely measured and programmed flow of the soy protein-containing composition through the inlet to the column. A variety of pumps are known for use in chromatographic systems such as constant flow rate pumps, reciprocating pumps, positive displacement (i.e., synnge) pumps and constant pressure pumps. A filter placed in line below the pump may be used as well as a pressure gauge to monitor the pressure in the system.

Feed reservoir 2 and column 3 are preferably constructed of any of a variety of chemically resistant materials such as stainless steel, glass, and synthetic resin materials including, for example, polyethylene, polypropylene, and poly ether ether ketone. The column is typically cylindrical and both the length, diameter, and ratio of the length to the diameter may vary widely. The capacity of the column may also vary widely and typically depends on the overall amount of soy protein-containing composition to be treated, the volumetric flow rate of the soy protein-containing composition introduced to the column, or the bed of chromatographic material to be contained in the column.

As shown in FIG. 1, the column includes filters 9 and 10 at each end of the column having a mesh or pore size which prevents loss of resin from the column. Typically, the pore size of the filters is from 20 to 60 µm and, more typically, from 20 to 40 µm. The filters 9 and 10 may be constructed of materials selected from the group consisting of stainless steel, glass, and polymeric materials such as polyethylene and polytetrafluoroethylene.

To enable the treated soy protein-containing compositions of the present invention to be used as functional food ingredients, the resin preferably complies with the applicable regulations (e.g., 21 C.F.R. § 173.25 and 21 C.F.R. § 173.65) governing resins used in the preparation of "food-grade" compositions. Such resins include, for example, resins comprising methyl methacrylates, dextrans, agarose, and various silicas. Exemplary commercial resins include Sephacryl (S-100 HR) resins manufactured by Supelco (Bellefonte, Pa.); Toyopearl HW series methyl methacrylate resins (e.g., 40F, 40S, 50F, 50S, 55F, 55S, 60F, 60S, 65F, 65S, 75F, and 75S) manufactured by Supelco (Bellefonte, Pa.; TSKgel type silica resins manufactured by Tosoh Biosciences (Montgomeryville, Pa.); SuperDEX dextran resins manufactured by Amersham Biosciences (Piscataway, N.J.); and Superose agarose resins manufactured by Amersham Biosciences (Piscataway, N.J.).

In general, the pore size of the resin affects the selectivity of the resin for low molecular weight components in the soy protein-containing composition; soy proteins are generally excluded from pores of the resin while the low molecular weight components are able to enter the pores, thus leading to a greater retention time for the low molecular weight components and elution of a mixture of soy proteins having a reduced low molecular weight component content from the column. Typically, the pore size of the resin is at least 50 Å, more typically at least 125 Å and, still more typically, at least 500 Å. Typically, the pore size of the resin is from 50 to 2000 Å, more typically from 50 to 1000 Å and, still more typically, from 100 to 500 Å.

The range of molecular weights of the components excluded by the size exclusion resin based on its pore size is referred to as the fractionation range. The upper limit of the fractionation range indicates the largest molecules in terms of molecular weight able to enter the pores of the resin and, thus, the largest molecules to be separated from the proteins by size exclusion (i.e., molecules greater in size are excluded from the resin); this upper limit is commonly referred to as the size exclusion limit of the resin. The ability of a molecule of a certain molecular weight to enter the pores of the resin and, thus, be separated from the soy proteins, is currently believed to be due at least in part to the shape of the molecule. This is believed to be due to the effect of the shape of the molecule on its radius of gyration which generally determines the size of pores a molecule is able to enter and which may generally be expressed as proportional to $M^s$ where M is the molecular weight of the molecule and s varies depending on the shape of the molecule. For example, for rod-shaped molecules s generally equals 1, for flexible coil-shaped molecules s generally equals 0.5, and for spherical molecules s generally equals 0.33. Thus, as compared to rod shaped molecules, flexible coil-shaped molecules having higher molecular weights may be able to enter the pores of a resin. In addition, as compared to both rod shaped and flexible coil-shaped molecules, higher molecular weight spherical molecules may be able to enter the pores of a resin. Depending on the composition to be treated and the resin selected, the size exclusion limit may range up to 700,000 daltons, up to 800,000 daltons, up to 5,000,000 daltons, or up to 50,000,000 daltons. The fractionation range may vary below the size exclusion limit. Exemplary fractionation ranges include those ranging from 1000 to 700,000 daltons, from 500 to 800,000 daltons, and from 100 to 100,000 daltons. In various embodiments, the resin has a size exclusion limit of S in which S is no more than 50,000 daltons and components of the soy protein-containing composition having a molecular weight less than S are retained by the resin and components having a molecular weight greater than S are not retained by the resin.

In addition to pore size of the resin and the attendant fractionation range and size exclusion limit, the particle size of the resin may also be taken into consideration. It has been observed that removal of the low molecular weight components from the soy protein-containing composition may improve as the particle size of the resin decreases. This is presently believed to be due to the increase in surface area of resin exposed to the soy protein-containing composition as the particle size of the resin decreases.

In certain embodiments, the particle size of the resin is no more than 60 µm. In such embodiments, the particle size of the resin is generally from 20 to 60 µm or from 30 to 60 µm. In other embodiments, the particle size of the resin is no more than 40 µm. In such embodiments, the particle size of the resin is generally from 20 to 40 µm.

In one preferred embodiment, the resin has a pore size of 500 Å, a fractionation range of from 1000 to 700,000 daltons, and the particle size of the resin is from 20 to 40 µm.

In general, the column comprises the bed of size exclusion resin and the chromatographic separation zone, each occupying all or a portion of the column. The bed of size exclusion resin may be prepared by introducing the resin to the column in accordance with standard packing techniques including, for example, dry packing, wet packing, slurry packing, or downflow or upflow packing methods. The characteristics of the bed of size exclusion resin (e.g., length, volume, density) may depend on numerous factors including, for example, the overall amount of soy protein-containing composition to be treated, the rate of introduction of the soy protein-containing composition to the column, the protein content of the soy protein-containing composition, and the solids content of the soy protein-containing composition. Typically, the column contains a resin height of at least 1 cm of resin per gram of solids in the soy protein-containing composition feed and, more typically, at least 2 cm of resin per gram of solids in the feed.

The amount of resin, or, bed of chromatographic material may be expressed in terms of the amount of resin contained in the column determined based on the length of the bed of chromatographic material and the diameter of the column (i.e., resin bed volume). Thus, while the length and diameter of the column are not narrowly critical, the dimensions of the column are generally selected to provide space for a suitable bed volume. The ratio of the length of the column to its diameter is typically at least 2:1, more typically at least 5:1 and, still more typically, from 10:1 to 20:1.

The flow rate through the bed of chromatographic material generally allows time for sufficient contact between the feed composition and the resin to ensure removal of a sufficient amount of low molecular weight components. Typically, the soy protein-containing composition passes through the bed of chromatographic material at a rate of at least 0.05 liters per hour per unit $m^2$ cross sectional area of the bed.

Taking into account the desired flow rate of the soy protein-containing composition, the volume of the resin bed is preferably selected to provide sufficient contact time for the resin to significantly reduce the content of low molecular weight components in the composition. Typically, no more than <0.25 (25% resin bed volume) $m^3$ of soy protein-containing composition per $m^3$ resin bed volume are introduced to the column, more typically no more than <0.20 $m^3$ of soy protein-containing composition per $m^3$ resin bed volume and, still more typically, no more than 0.15 $m^3$ of soy protein-containing composition per $m^3$ resin bed volume.

In one embodiment, the soy protein-containing composition may be treated by passage through two or more of columns or cartridges arranged in series. Alternatively, the soy protein-containing composition may be treated by passage through two or more of columns or cartridges arranged in parallel; in this arrangement, one or more cartridges or columns may be used to treat the composition while one or more cartridges or columns is being regenerated.

By selecting a size exclusion resin having a size exclusion limit below the molecular weight of the soy proteins in the feed composition of interest, these proteins are allowed to pass through the bed of size exclusion resin while low molecular weight components which contribute undesired characteristics are retained. Soy protein-containing compositions typically contain two or more soy proteins having a molecular weight in excess of 50,000 daltons and, since they are not retained by the size exclusion resin, the relative amount of these proteins in the feed and treated product does not substantially change. Stated another way, the relative proportions of any two soy proteins having a molecular weight of 50,000 daltons in the treated product does not vary significantly from the relative proportions of these proteins in the feed composition. In one embodiment, the relative proportion (on a weight ratio) does not vary by more than 20%. More preferably, the relative proportion (on a weight ratio) does not vary by more than 10%. Still more preferably, the relative proportion (on a weight ratio) does not vary by more than 5%. By way of example, if a feed composition comprises soy proteins, A, B, and C, each having a molecular weight greater than 50,000 daltons, the weight ratio of each these proteins to the others (i.e., the weight ratio of A:B, A:C, and B:C in this example) in the treated composition is within 20% of the weight ratio of each such pair, respectively, in the feed composition. Thus, for example, if the weight ratio of protein A to protein B in the feed composition is 1:1, the weight of A:B in the eluted composition will be 0.8:1 to 1.2:1, respectively. Similarly, if the weight ratio of protein B to protein C in the feed composition is 2:1, the weight of B:C in the eluted composition will be 1.6:1 to 2.4:1, respectively. Typically, soy protein-containing feed compositions contain glycinin, β-conglycinin, lipoxygenase, r-conglycinin, and β-amylase, each of which have a molecular weight in excess of 50,000 daltons. After a feed composition containing these proteins is passed through a bed of a size exclusion resin having a size exclusion limit less than 50,000 daltons in accordance with the process of the present invention, therefore, the weight ratio of, for example, glycinin to β-conglycinin, glycinin to lipoxygenase, and β-conglycinin to lipoxygenase will not vary by more than 20%, preferably by no more than 10%, and still more preferably by no more than 5% relative to the feed composition.

During operation of the process, the temperature within the column is not narrowly critical. One consideration is the resin's ability to withstand the process temperature and generally the temperature within the column is no more than 100° C. (212° F.). Typically, the temperature within the column is from 15 to 100° C. (from 60 to 212° F.), more typically from 20 to 80° C. (from 70 to 175° F.) more typically from 20 to 60° C. (from 70 to 140° F.) and, still more typically, from 20 to 40° C. (from 70 to 105° F.). It has been observed that higher temperatures in the column may increase the elution rate which is believed to be due, at least in part, to an increase in viscosity of the soy protein-containing composition.

The pressure within the column is not narrowly critical and is typically maintained below the level at which the resin may become compacted. Typically, the pressure within the column is less than 145 psi (10 bar) and, more typically, less than 70 psi (5 bar).

The viscosity of a soy protein-containing composition treated by the process of the present invention is not narrowly critical and generally any composition having a viscosity enabling them to flow through the column can be treated. The term viscosity as used herein refers to the apparent viscosity of a slurry or a solution as measured with a rotating spindle viscometer utilizing a large annulus, where a particularly preferred rotating spindle viscometer is a Brookfield viscometer. The apparent viscosity of a soy protein material may be measured, for example, by weighing a sample of the soy material and water to obtain a known ratio of the soy material to water (preferably 1 part soy material to 7 parts water, by weight), combining and mixing the soy material and water in a blender or mixer to form a homogenous slurry of the soy material and water at a temperature of about 20° C. and pH 7, and measuring the apparent viscosity of the slurry with the rotating spindle viscometer utilizing a large annulus, operated at approximately 30 to 60 revolutions per minute (rpm) and at a torque of from 30 to 70%.

The pH of the soy protein-containing composition affects the solubility of the proteins contained therein. Thus, the soy protein-containing composition is generally maintained at a pH which ensures the solubility of the proteins in the soy protein-containing composition. If the proteins do not remain soluble in the soy protein-containing composition to be treated the purity (i.e., protein content) of the treated soy protein-containing of soy proteins eluted from the column may be adversely affected. Generally, the soy proteins remain soluble in the soy protein-containing composition when its pH is maintained at from 6 to 10. Typically the pH of the soy protein-containing composition is maintained at from 7 to 10, more typically from 8 to 10 and, still more typically, from 9 to 10.

The overall productivity of the process depends on numerous factors including, for example, the efficiency of the column, the residence time of the composition within the bed of size exclusion resin, the characteristics of the soy protein-containing composition (e.g., protein content and solids content), amount of soy protein-containing composition introduced to the column, and its rate of introduction. Generally the process is carried out in such a manner that the amount of soy protein-containing composition introduced to the column and its rate of introduction allow for producing a sufficient amount of treated soy protein-containing composition.

The resin may be cleaned and regenerated to allow the resin to be used to treat multiple feed compositions, thus providing an important economic benefit to the overall process. Generally, the resin is contacted with multiple column volumes of one or more chemicals (e.g., sodium hydroxide and ethanol) followed by one or more water washings. One such method includes contacting the resin with 5 column volumes of sodium hydroxide, followed by contacting the resin with 5 column volumes of water, and contacting the resin with 5 column volumes of a 50 wt. % solution of ethanol followed by further water washing by contacting the resin with 5 column volumes of water.

Soy protein-containing compositions contacted with a size exclusion resin to remove certain low molecular weight components from in accordance with the process of the present invention exhibit a high purity (i.e., high protein content) which make these compositions desirable for use as functional food ingredients. Typically, treated soy protein-containing compositions contain at least 90% by weight protein on a moisture-free basis, at least 95% by weight protein on a moisture-free basis or even at least 98% by weight protein on a moisture-free basis. In addition, soy protein-containing compositions contacted with a size exclusion resin selective for certain low molecular weight components in accordance with the process of the present invention exhibit improved flavor, odor, appearance (e.g., color), or other characteristics (e.g., reduced inducement of intestinal gas and flatulence in humans) characteristics which make these compositions desirable for use as functional food ingredients. These improvements may be realized for soy-protein compositions containing relatively unrefined materials such as soy flakes to substantially refined materials such as soy protein isolates. Furthermore, in one embodiment, the process of the present invention may be used to provide soy protein-containing compositions having substantially improved, and in some embodiments, previously unattained flavor, odor, appearance, or other characteristics. For example, the resulting, treated soy protein-containing composition typically has a total low molecular weight component content of no more than 500 parts per million (ppm), more typically of no more than 350 and, still more typically, of no more than 200 ppm. The total low molecular weight component content of the treated soy protein-containing composition consists of those components of the composition having a molecular weight of from 80 to 17,000 daltons which are absorbed by ultraviolet radiation having a wavelength of from 200 to 400 nanometers (nm).

The improved flavor and odor characteristics of the treated soy protein-containing composition are due to removal of certain volatile components present in the feed composition. These volatile components include, for example, certain aldehydes and ketones having less than ten carbon atoms (e.g., pentanal, hexanal, etc.) mentioned above. Particular flavors and odors have been specifically associated with certain volatile components, some of which are summarized below in Table 1.

TABLE 1

| Flavor/Odor | Volatile Component |
| --- | --- |
| Green, grassy, beany | Pentan-1-ol, Hexan-1-ol, Heptan-1-ol, 3-Methylbutan-1-ol, Oct-1-en-3-ol, Pentanal, Hexanal, Heptanal, cis- and trans-pent-2-enal, cis-Hex-3-enal, trans-Hex-2-enal, Hept-2-enal, Hexa-trans-2,trans-4-dienal, Nona-2,4-dienal, Nona-trans-2,cis-6-dienal, Deca-2,4-dienal, Undecan-2-one, Butenone, Pent-1-en-3-one, Oct-3-en-2-one, Dec-1-yne, 2-Pentylfuran, cis- and trans-2-(pent-1-enyl)furan, and cis- and trans-2-(pent-2-enyl)furan |
| Cooked soybean, repulsive | Vinylphenol and 4-Vinylguaiacol |
| Cooked vegetable (e.g., cabbage) | Dimethyl sulfide |
| Deep-fried | Deca-trans-2,trans-4-dienal |
| Buttery | Butanedione and Pentane-2,3-dione |
| Oily, fatty, tallow-like, and putty | Hexanal, Heptanal, Octanal, Nonanal, cis- and trans-hept-2-enal, cis- and trans-oct-2-enal, Non-2-enal, trans-Non-3-enal, trans-Dec-2-enal, trans-Undec-2-enal, Hepta-trans-2,trans-4-dienal, Nona-trans-2,trans-4-dienal, Nona-trans-2,trans-6-dienal, Deca-2,4-dienal, and Oct-3-en-2-one |
| Musty, moldy, and earthy | Oct-1-en-3-ol, Geosmin and Acetophenone |
| Mushroom | Oct-1-en-3-ol and Oct-1-en-3-one. |
| Oxidized, cardboard-like, oily, and paint-like | Higher alka-2,4-dienals (e.g., $C_7$, $C_8$, $C_9$, $C_{10}$) |
| Fishy | Aliphatic amines, cis-Hept-4-enal, and Deca-trans-2,cis-4,cis-7-trienal |

Generally, the treated soy protein-containing composition has a substantially reduced green, grassy, beany, oily, fatty, tallow-like, or putty off flavor as compared to a soy protein-containing composition that has not been treated for removal of volatile components. Typically, the treated soy protein-containing composition has a total volatile component content of no more than 150 parts per billion (ppb), more typically no more than 100 ppb and, still more typically, no more than 50 ppb. The total volatile component content of the treated soy protein-containing composition represents the total proportion of aldehydes and ketones having less than 10 carbon atoms present in the treated soy protein-containing composition.

Many soy protein-containing feed compositions will have, to varying degrees, a yellowish or brownish color. In general, the color of these compositions can be "improved," i.e., the "whiteness index" of the product can be increased by the process of the present invention. In general, the whiteness index is determined using a colorimeter which provides the L, a, and b color values for the composition from which the whiteness index may be calculated using a standard expression of the Whiteness Index (WI), WI=L−3b . The L component generally indicates the whiteness or, "lightness", of the sample; L values near 0 indicate a black sample while L values near 100 indicate a white sample. The b value indicates yellow and blue colors present in the sample; positive b values indicate the presence of yellow colors while negative b values indicate the presence of blue colors. The a value, which may be used in other color measurements, indicates red and green colors; positive values indicate the presence of red colors while negative values indicate the presence of green colors. For the b and a values, the absolute value of the measurement increases directly as the intensity of the corresponding color increases. Generally, the colorimeter is standardized using a white standard tile provided with the colorimeter. A sample is then placed into a glass cell which is introduced to the colorimeter. The sample cell is covered with an opaque cover to minimize the possibility of ambient light reaching the detector through the sample and serves as a constant during measurement of the sample. After the reading is taken, the sample cell is emptied and typically refilled as multiple samples of the same material are generally measured and the whiteness index of the material expressed as the average of the measurements. Suitable calorimeters generally include those manufactured by HunterLab (Reston, Va.) including, for example, Model # DP-9000 with Optical Sensor D 25.

After treatment in accordance with the process of the present invention, aqueous mixtures comprising the resulting soy protein-containing composition may have an improvement in the whiteness index of up to 30, with whiteness indices of up to 85 being attainable depending upon the type of soy protein material and process conditions. Such an aqueous mixture may exhibit a whiteness index of greater than 50, greater than 60, greater than 65, greater than 70, or even greater than 75. Typically, the whiteness index of an aqueous mixture of the treated composition is from 50 to 85, more typically from 60 to 80, still more typically from 65 to 80 and, still more typically, from 70 to 80.

The present process enables the preparation of soy protein-containing compositions such that aqueous mixtures of the composition have whiteness indices of greater than 50 in which the L value is less than 78, less than 75, less than 70, less than 65, or even less than 60. Additionally, or alternatively, the b value of such materials is typically less than 5, more typically less than 3 and, still more typically, less than 1.

Such whiteness indices, L values, and b values are generally observed for aqueous mixtures of treated soy protein-containing compositions containing having a soy protein content of 2 to 3% by weight and a pH of from 6.8 to 7.2.

In various embodiments, the treated soy protein-containing composition is in the form of solid (e.g., a free-flowing solid) and an aqueous mixture containing 2 to 3% by weight soy protein is prepared by combining the treated composition with deionized water to achieve the desired protein content. Additionally or alternatively, the pH of the mixture may be achieved by introduction of an acid or base, as necessary, to adjust the pH of the mixture to a value of 6.8 to 7.2.

In other embodiments, the treated soy protein-containing composition is in the form of a liquid and an aqueous mixture having a soy protein content of 2 to 3% by weight is prepared by increasing or decreasing the water content of the liquid composition, as necessary. For example, in the case of a liquid composition containing greater than 3% by weight soy protein, deionized water may be added to the liquid to decrease its soy protein content to a value of 2 to 3% by weight. By way of further example, in the case of a liquid composition containing less than 3% by weight soy protein, the water content of the liquid is reduced to increase its soy protein content to a value of 2 to 3% by weight. The water content of such a composition may be reduced by, for example, drying the composition. Regardless of any adjustment in its water content, a pH of 6.8 to 7.2 may be achieved by introducing an acid or base to the mixture, as necessary.

Aqueous mixtures containing treated soy protein-containing compositions in accordance with the present invention (when having, or when adjusted to, if necessary, a soy protein content of 2 to 3% by weight and a pH of 6.8 to 7.2) typically have whiteness indices of greater than 50 in which the L value is less than 78, less than 75, less than 70, less than 65, or even less than 60.

Additionally or alternatively, the b value of such an aqueous mixture is typically less than 5, more typically less than 3 and, still more typically, less than 1.

Generally, the whiteness index of the soy protein-containing compositions increases as either or both of solids content or pH of the composition decreases below these levels. At lower solids content (e.g., less than 4% by weight on a protein basis), the concentration of color-causing components, as indicated by the b value, is lowered. Since whiteness index is determined by the expression WI=L-3b, as the b value decreases, the whiteness index increases. At a pH below 6.8, color-causing, low molecular weight components are generally insoluble and tend to precipitate whereas at a pH greater than 7.2 the color-causing, low molecular weight components are soluble and remain in solution where they affect the color of the composition. In accordance with the present invention, however, improvements in whiteness index are observed regardless of the initial whiteness index and regardless of whether the whiteness index of the soy protein-containing composition to be treated is determined in part by its solids content or pH.

The improved color characteristics of the treated soy protein-containing composition are due to removal of certain non-volatile components present in the feed composition and, in particular, removal of non-volatile isoflavones present in the feed composition. Typically, the treated soy protein-containing composition has a total isoflavone content of less than 200 ppm, less than 100 ppm, less than 90 ppm, less than 80 ppm, less than 50 ppm, less than 25 ppm, or even less than 15 ppm. Isoflavones present in the soy protein-containing composition are generally selected from (i) aglucone and non aglucone type daidzin, daidzein, genistin, genistein, glycitin, and glycitein isoflavones, and (ii) the malonyl and acetyl esters of aglucone and non aglucone type daidzin, daidzein, genistin, genistein, glycitin, and glycitein isoflavones.

The total isoflavone content of the treated soy protein-containing composition of the present invention comprising a soy protein material may be expressed in terms of the weight ratio to the combined weight of all isoflavones present in the material. Generally, the weight ratio of soy protein material to the weight ratio of all isoflavones is at least 3,000:1, typically at least 5,000:1 and, more typically, at least 10,000:1. In certain embodiments, the weight ratio of soy protein material to the weight ratio of all isoflavones is at least 100,000:1 or at least 200,000:1.

Reduced inducement of intestinal gas and flatulence in humans by the treated soy protein-containing composition of the present invention is due to removal of certain non-volatile carbohydrates present in the feed composition. In particular, removal of carbohydrates selected from the group consisting of fructose, glucose, sucrose, maltose, lactose, stachyose, and raffinose. Typically, the treated composition contains less than 0.2% by weight of each of these carbohydrates.

Other characteristics of the soy protein-containing composition including, for example, solids content, viscosity, and pH, are generally unaffected by treatment of the soy protein-containing composition with the size exclusion resin and thus typically remain within the ranges set forth above.

Treated soy protein-containing compositions produced in accordance with the present process are suitable for use as functional food ingredients in a variety of applications including, for example, meats, including frankfurters, sausages, bologna, ground and minced meats and meat patties, to bind the meat and give the meat a good texture and a firm bite. The treated soy protein-containing compositions may also be used as functional food ingredients in creamed soups, gravies, and yogurts where the soy protein material acts as a thickening agent and provides a creamy viscosity to the food product. The treated soy protein containing compositions may also be used as functional food ingredients in numerous other food products such as dips, dairy products, tuna, breads, cakes, macaroni, confections, whipped toppings, baked goods and many other applications.

Lower viscosity treated soy protein-containing compositions may be desired for use as functional food ingredients for liquid products (i.e., beverages) whereas higher viscosity compositions may be desired when the intended applications for the composition include incorporation into a meat product. Thus, in certain embodiments, the soy protein-containing composition introduced to the contact vessel is selected based on the desired viscosity of the treated soy protein-containing composition.

EXAMPLES

The present invention is illustrated by the following examples which are merely for the purpose of illustration and not to be regarded as limiting the scope of the invention or manner in which it may be practiced.

Example 1

An aqueous suspension is prepared by adding Promine DS soy protein concentrate (50 g) produced by the Solae Company (St. Louis, Mo.) to deionized water (500 ml); the aqueous suspension contains approximately 10% by weight solids. The pH of the suspension is adjusted to 9.5 by adding 1N sodium hydroxide.

The suspension is agitated for 1 hour using a Ceramag Midi stir plate manufactured by IKA Works, Inc. (Wilmington, De.). The suspension is transferred to 250 ml centrifuge tubes and the samples are centrifuged at approximately 3600 revolutions per minute (rpm) for approximately 20 minutes in an Avanti J-25 centrifuge manufactured by Beckman Instruments (Schaumburg, Ill.). Overflow of suspension from the centrifuge tubes is filtered by vacuum filtration using a Model No. 4 filter manufactured by Whatman Instruments, Ltd. (Maidstone, England) to remove solids that could foul the column.

The size exclusion column is prepared by addition of 1000 m³ of a Toyopearl HW-55F size exclusion resin manufactured by manufactured by Tosoh Biosciences (Montgomeryville, Pa.) to a glass column having a diameter of 1.5 cm and a height of 67 cm. The resin bed height is approximately 53 cm. The size exclusion resin has a fractionation range of from 1000 to 700,000 daltons and a particle size of from 30 to 60 μm. The column is packed by allowing five column volumes of eluant to flow through the resin bed.

The suspension is introduced to the column and purified protein fraction begins eluting at 735 minutes and ends at 1155 minutes. Fractions eluting from 0–735 minutes are clear to colorless; fractions eluting from 735–1155 minutes are milky white; fractions eluting after 1155 minutes blend from opaque tan changing to clear yellow/orange, back to clear colorless. It is currently believed that the color components being removed reside in the fractions eluted after 1155 minutes.

The moisture content, protein content, carbohydrate content, whiteness index, and isoflavone profile of the suspension, before and after treatment using the size exclusion resin, are described below in Table 2.

The moisture contents of the suspension before and after treatment are determined by Official Methods of Analysis of the AOAC, 16th Edition, (1995); Method 934.06, Locator # 37.1.10; 925.45, and 925.45A, Locator # 44.1.03.

The protein contents of the suspension before and after treatment are determined by the Nitrogen-Ammonia-Protein Modified Kjeldahl method described, for example, in A.O.C.S. (American Oil Chemists Society) Official Methods Bc 4-91(1997), Aa 5-91(1997), or Ba 4d-90(1997).

The carbohydrate content of various sugars in the suspension before and after treatment is determined by High Performance Liquid Chromatagraphy (HPLC) using a Beckman Instruments Chromatograph equipped with a UV detector and a Hypersil column having a 2.1 mm diameter and 200 mm height manufactured by Hewlett-Packard (Palo Alto, Calif.). The stachyose and raffinose contents are also determined by HPLC in this manner.

Whiteness index measurements of a 5% by weight solids sample of the suspension before and after treatment are determined using a HunterLab DP-9000 calorimeter including an optical sensor D-25, both manufactured by Hunter Associates Laboratory (HunterLab) (Reston, Va.). For the whiteness index measurement before treatment, Promine DS soy protein concentrate (5.25 g) is added to deionized water (100 ml) and the pH of the sample is adjusted to 7 using 1N sodium hydroxide. For the whiteness index measurements of the suspension after treatment, a soy protein curd is precipitated from the treated suspension by adjusting the pH of the treated suspension to pH 4.5 by addition of 1N hydrochloric acid and centrifuging at 3600 rpm for 20 minutes using the centrifuge described above. The pH of a 5% by weight solids sample of the soy protein curd is adjusted to 7 using 1N sodium hydroxide and its whiteness index is measured.

The isoflavone profile of the suspension before and after treatment was determined by HPLC using the Beckman Instruments chromatograph described above.

TABLE 2

| | Before Treatment | After Treatment |
|---|---|---|
| Moisture Content | 4.84 | 82.6 |
| Total Protein | 65.4 | 17.8 |
| Protein (dry basis) | 68.72 | 98.86 |
| Sugar Profile (% by weight) | | |
| Fructose | <0.2 | <0.2 |
| Glucose | <0.2 | <0.2 |
| Sucrose | 0.32 | <0.2 |
| Maltose | <0.2 | <0.2 |
| Lactose | <0.2 | <0.2 |
| Additional Carbohydrates (% by weight) | | |
| Stachyose | 1.96 | <0.2 |
| Raffinose | <0.2 | <0.2 |
| Color (5% solids, pH 7.0) | | |
| L | 69.32 | 60.24 |
| a | −2.01 | −2.65 |
| b | 10.98 | −7.25 |
| WI | 36.39 | 81.99 |
| Isoflavone Profile (ppm) | | |
| Daidzin | 16.0 | <1 |
| 6-OMal-Daidzin | 16.0 | <1 |
| 6-OAc-Daidzin | 4.0 | <1 |
| Daidzein | <1 | <1 |
| Total Daidzein Compounds | 36.0 | <1 |
| Genistin | 26.0 | <1 |
| 6-OMal-Genistin | 18.0 | <1 |
| 6-OAc-Genistin | 5.0 | <1 |
| Genistein | <1 | <1 |
| Total Genistein Compounds | 49.0 | <1 |
| Glycitin | 6.0 | <1 |
| 6-OMal-Glycitin | 4.0 | <1 |
| Glycitein | <1 | <1 |
| Total Glycitein Compounds | 10.0 | <1 |
| Total Isoflavones | 95.0 | <1 |
| Daidzin (aglucone units) | 10.0 | <1 |
| 6-OMal-Daidzin (aglucone units) | 8.0 | <1 |
| 6-OAc-Daidzin (aglucone units) | 2.0 | <1 |
| Daidzein (aglucone units) | <1 | <1 |
| Total Daidzein (aglucone units) | 20.0 | <1 |
| Genistin (aglucone units) | 16.0 | <1 |
| 6-OMal-Genistin (aglucone units) | 9.0 | <1 |
| 6-OAc-Genistin (aglucone units) | 3.0 | <1 |
| Genistein (aglucone units) | <1 | <1 |
| Total Genistein (aglucone units) | 28.0 | <1 |
| Glycitin (aglucone units) | 4.0 | <1 |
| 6-OMal-Glycitin (aglucone units) | 2.0 | <1 |
| Glycitein (aglucone units) | <1 | <1 |
| Total Glycitein (aglucone units) | 6.0 | <1 |
| Total All Forms (aglucone units) | 54.0 | <1 |

As shown in Table 2, treating a dispersion prepared as described above using the size exclusion resin increases its protein content, reduces the sucrose and stachyose content, increases its whiteness index, and provides a treated composition having a reduced isoflavone content.

Example 2

An aqueous suspension is prepared by adding commodity white soy protein flakes (50.0 g) produced by Cargill, Inc. (Minneapolis, Minn.) to deionized water (500 ml); the aqueous suspension contains approximately 10% by weight solids. The pH of the suspension is adjusted to 9.5 by adding 1N sodium hydroxide. The suspension is agitated, centrifuged, and filtered as described in Example 1.

The suspension is treated using the column and size exclusion resin described in Example 1. The moisture content, protein content, whiteness index, and isoflavone profile of the suspension before and after treatment using the size exclusion resin, are determined as described in Example 1. For the whiteness index measurement before treatment, commodity white soy protein flakes described above in the present example (5.29 g) are added to deionized water (100 ml) and the pH of the sample is adjusted to 7 using 1N sodium hydroxide. For the whiteness index measurements of the suspension after treatment, a soy protein curd is precipitated from the treated suspension as described in Example 1. The pH of a 5% by weight solids sample of the soy protein curd is adjusted to 7 using 1N sodium hydroxide and its whiteness index is measured. The results are shown below in Table 3.

TABLE 3

|  | Before Treatment | After Treatment |
| --- | --- | --- |
| Moisture Content | 5.62 | 78.2 |
| Total Protein | 50 | 21.5 |
| Protein (dry basis) | 52.98 | 98.62 |
| Sugar Profile (% by weight) | | |
| Fructose | <0.2 | <0.2 |
| Glucose | <0.2 | <0.2 |
| Sucrose | 8.23 | <0.2 |
| Maltose | <0.2 | <0.2 |
| Lactose | <0.2 | <0.2 |
| Additional Carbohydrates (% by weight) | | |
| Stachyose | 4.59 | <0.2 |
| Raffinose | 0.65 | <0.2 |
| Color (5% solids, pH 7.0) | | |
| L | 60.3 | 46.54 |
| a | −2.87 | −2.49 |
| b | 14.45 | −7.12 |
| WI | 16.94 | 67.9 |
| Isoflavone Profile (ppm) | | |
| Daidzin | 598.0 | <1 |
| 6-OMal-Daidzin | 1900.0 | <1 |
| 6-OAc-Daidzin | 55.0 | <1 |
| Daidzein | 22.0 | <1 |
| Total Daidzein Compounds | 2580.0 | <1 |
| Genistin | 772.0 | <1 |
| 6-OMal-Genistin | 2220.0 | <1 |
| 6-OAc-Genistin | 65.0 | <1 |
| Genistein | 18.0 | <1 |
| Total Genistein Compounds | 3070.0 | <1 |
| Glycitin | 111.0 | <1 |
| 6-OMal-Glycitin | 227.0 | <1 |
| Glycitein | 1.0 | <1 |
| Total Glycitein Compounds | 339.0 | <1 |
| Total Isoflavones | 5990.0 | <1 |
| Daidzin (aglucone units) | 365.0 | <1 |
| 6-OMal-Daidzin (aglucone units) | 963.0 | <1 |
| 6-OAc-Daidzin (aglucone units) | 31.0 | <1 |
| Daidzein (aglucone units) | 22.0 | <1 |
| Total Daidzein (aglucone units) | 1380.0 | <1 |
| Genistin (aglucone units) | 483.0 | <1 |
| 6-OMal-Genistin (aglucone units) | 1150.0 | <1 |
| 6-OAc-Genistin (aglucone units) | 37.0 | <1 |
| Genistein (aglucone units) | 18.0 | <1 |

TABLE 3-continued

|  | Before Treatment | After Treatment |
| --- | --- | --- |
| Total Genistein (aglucone units) | 1690.0 | <1 |
| Glycitin (aglucone units) | 71.0 | <1 |
| 6-OMal-Glycitin (aglucone units) | 121.0 | <1 |
| Glycitein (aglucone units) | 1.0 | <1 |
| Total Glycitein (aglucone units) | 193.0 | <1 |
| Total All Forms (aglucone units) | 3270.0 | <1 |

As shown in Table 3, treating the dispersion prepared as described above using the size exclusion resin increases its protein content, reduces the sucrose, stachyose, and raffinose content; increases its whiteness index; and provides a treated composition having a reduced isoflavone content.

Example 3

An aqueous suspension is prepared by adding soybeans from seeds obtained from Stine Seed Co. (Adel, Iowa), Variety 806301-03, Lot No. FCISOE 203) ground using a 1 mm screen to produce a fine powder (50.0 g) to deionized water (500 ml); the aqueous suspension contains approximately 10% by weight solids. The pH of the suspension is adjusted to 9.5 by adding 1N sodium hydroxide. The suspension is agitated, centrifuged, and filtered as described in Example 1.

The suspension is treated using the column and size exclusion resin described above in Example 1. The moisture content, protein content, whiteness index, and isoflavone profile of the suspension, before and after treatment using the size exclusion resin, are determined as described above in Example 1. For the whiteness index measurement before treatment, powder prepared as described above in the present example (5.35 g) is added to deionized water (100 ml) and the pH of the sample is adjusted to 7 using 1N sodium hydroxide. For the whiteness index measurements of the suspension after treatment, a soy protein curd is precipitated from the treated suspension as described above in Example 1. The pH of a 5% by weight solids sample of the soy protein curd is adjusted to 7 using 1N sodium hydroxide and its whiteness index is measured. The results are shown below in Table 4.

TABLE 4

|  | Before Treatment | After Treatment |
| --- | --- | --- |
| Moisture Content | 6.58 | 77.1 |
| Total Protein | 36.8 | 22.2 |
| Protein (dry basis) | 39.39 | 96.94 |
| Sugar Profile (% by weight) | | |
| Fructose | <0.2 | <0.2 |
| Glucose | <0.2 | <0.2 |
| Sucrose | 5.75 | <0.2 |
| Maltose | <0.2 | <0.2 |
| Lactose | <0.2 | <0.2 |
| Additional Carbohydrates (% by weight) | | |
| Stachyose | 3.4 | <0.2 |
| Raffinose | 0.75 | <0.2 |
| Color (5% solids, pH 7.0) | | |
| L | 75.7 | 74.06 |
| a | −1.97 | −3.18 |

TABLE 4-continued

| | Before Treatment | After Treatment |
|---|---|---|
| b | 19.65 | 4.24 |
| WI | 16.74 | 61.33 |
| Isoflavone Profile (ppm) | | |
| Daidzin | 408.0 | <1 |
| 6-OMal-Daidzin | 972.0 | <1 |
| 6-OAc-Daidzin | 14.0 | <1 |
| Daidzein | 10.0 | <1 |
| Total Daidzein Compounds | 1400.0 | <1 |
| Genistin | 669.0 | <1 |
| 6-OMal-Genistin | 1520.0 | <1 |
| 6-OAc-Genistin | 21.0 | <1 |
| Genistein | 12.0 | <1 |
| Total Genistein Compounds | 2220.0 | <1 |
| Glycitin | 77.0 | <1 |
| 6-OMal-Glycitin | 138.0 | <1 |
| Glycitein | <1 | <1 |
| Total Glycitein Compounds | 215.0 | <1 |
| Total Isoflavones | 3840.0 | <1 |
| Daidzin (aglucone units) | 249.0 | <1 |
| 6-OMal-Daidzin (aglucone units) | 492.0 | <1 |
| 6-OAc-Daidzin (aglucone units) | 8.0 | <1 |
| Daidzein (aglucone units) | 10.0 | <1 |
| Total Daidzein (aglucone units) | 759.0 | <1 |
| Genistin (aglucone units) | 418.0 | <1 |
| 6-OMal-Genistin (aglucone units) | 790.0 | <1 |
| 6-OAc-Genistin (aglucone units) | 12.0 | <1 |
| Genistein (aglucone units) | 12.0 | <1 |
| Total Genistein (aglucone units) | 1230.0 | <1 |
| Glycitin (aglucone units) | 49.0 | <1 |
| 6-OMal-Glycitin (aglucone units) | 74.0 | <1 |
| Glycitein (aglucone units) | <1 | <1 |
| Total Glycitein (aglucone units) | 123.0 | <1 |
| Total All Forms (aglucone units) | 2110.0 | <1 |

As shown in Table 4, treating the dispersion prepared as described above using the size exclusion resin increases its protein content, reduces the sucrose, stachyose, and raffinose content; increases its whiteness index; and provides a treated composition having a reduced isoflavone content.

Example 4

An aqueous suspension is prepared by adding Supro 670 soy protein isolate (50.0 g) produced by the Solae Company (St. Louis, Mo.) to deionized water (500 ml); the aqueous suspension contains approximately 10% by weight solids. The pH of the suspension is adjusted to 9.5 by adding 1N sodium hydroxide. The suspension is agitated, centrifuged, and filtered as described above in Example 1.

The suspension is treated using the column and size exclusion resin described above in Example 1. The moisture content, protein content, whiteness index, and isoflavone profile of the suspension, before and after treatment using the size exclusion resin, are determined as described above in Example 1. For the whiteness index measurement before treatment, soy protein isolate described above in the present example (5.21 g) is added to deionized water (100 ml) and the pH of the sample is adjusted to 7 using 1N sodium hydroxide. For the whiteness index measurements of the suspension after treatment, a soy protein curd is precipitated from the treated suspension as described above in Example 1. The pH of a 5% by weight solids sample of the soy protein curd is adjusted to 7 using 1N sodium hydroxide and its whiteness index is measured. The results are shown below in Table 5.

TABLE 5

| | Before Treatment | After Treatment |
|---|---|---|
| Moisture Content | 4.06 | 84.9 |
| Total Protein | 86.7 | 13.2 |
| Protein (dry basis) | 90.36 | 87.42 |
| Sugar Profile (% by weight) | | |
| Fructose | <0.2 | <0.2 |
| Glucose | <0.2 | <0.2 |
| Sucrose | <0.2 | <0.2 |
| Maltose | <0.2 | <0.2 |
| Lactose | <0.2 | <0.2 |
| Additional Carbohydrates (% by weight) | | |
| Stachyose | <0.2 | <0.2 |
| Raffinose | <0.2 | <0.2 |
| Color (5% solids, pH 7.0) | | |
| L | 79.09 | 68.1 |
| a | −0.93 | −3.11 |
| b | 12.53 | 1.85 |
| WI | 41.49 | 62.55 |
| Isoflavone Profile (ppm) | | |
| Daidzin | 144.0 | <1 |
| 6-OMal-Daidzin | 334.0 | <1 |
| 6-OAc-Daidzin | 36.0 | <1 |
| Daidzein | 23.0 | 1.0 |
| Total Daidzein Compounds | 537.0 | 1.0 |
| Genistin | 347.0 | 1.0 |
| 6-OMal-Genistin | 611.0 | <1 |
| 6-OAc-Genistin | 84.0 | <1 |
| Genistein | 34.0 | 2.0 |
| Total Genistein Compounds | 1080.0 | 3.0 |
| Glycitin | 25.0 | <1 |
| 6-OMal-Glycitin | 31.0 | <1 |
| Glycitein | 3.0 | 2.0 |
| Total Glycitein Compounds | 59.0 | 2.0 |
| Total Isoflavones | 1670.0 | 5.0 |
| Daidzin (aglucone units) | 88.0 | <1 |
| 6-OMal-Daidzin (aglucone units) | 169.0 | <1 |
| 6-OAc-Daidzin (aglucone units) | 20.0 | <1 |
| Daidzein (aglucone units) | 23.0 | 1.0 |
| Total Daidzein (aglucone units) | 300.0 | 1.0 |
| Genistin (aglucone units) | 217.0 | 1.0 |
| 6-OMal-Genistin (aglucone units) | 318.0 | <1 |
| 6-OAc-Genistin (aglucone units) | 48.0 | <1 |
| Genistein (aglucone units) | 34.0 | <1 |
| Total Genistein (aglucone units) | 617.0 | 3.0 |
| Glycitin (aglucone units) | 16.0 | <1 |
| 6-OMal-Glycitin (aglucone units) | 17.0 | <1 |
| Glycitein (aglucone units) | 3.0 | 1.0 |
| Total Glycitein (aglucone units) | 36.0 | 1.0 |
| Total All Forms (aglucone units) | 953.0 | 5.0 |

As shown in Table 5, treatment of the dispersion prepared as described above using the size exclusion resin increases its whiteness index and provides a treated composition having a reduced isoflavone content.

The invention claimed is:

1. A process for preparing a treated soy protein-containing composition, the process comprising:
feeding a food-grade soy protein-containing composition having a pH of from 6 to 10 to a chromatographic separation zone, the chromatographic separation zone comprising a bed of size exclusion resin, the resin having a size exclusion limit, passing the food-grade soy protein-containing composition through the bed of size exclusion resin to reduce the concentration of components in the food-grade soy protein-containing composition having a molecular weight less than the size exclusion limit of the resin to form the treated soy protein-containing composition, eluting the treated soy protein-containing composition from the chromatographic separation zone after it has passed through the bed of size exclusion resin, and drying the treated soy protein-containing composition after it has been eluted from the chromatographic separation zone.

2. A process for preparing a treated soy protein-containing composition, the process comprising:

feeding a food-grade soy protein-containing composition having a pH of from 6 to 10 to a chromatographic separation zone, the food-grade soy protein-containing composition comprising at least two soy proteins having a molecular weight of at least 50,000 daltons, the chromatographic separation zone comprising a bed of size exclusion resin having a size exclusion limit of S, wherein S is no more than 50,000 daltons, whereby components of the food-grade soy protein-containing composition having a molecular weight less than S are retained by the resin and components having a molecular weight greater than S are not retained by the resin, passing the food-grade soy protein-containing composition through the bed of size exclusion resin to reduce the concentration of components in the food-grade soy protein-containing composition having a molecular weight less than the size exclusion limit of the resin to form a treated soy protein-containing composition, eluting the treated soy protein-containing composition after it has passed through the bed of size exclusion resin, and drying the treated soy protein-containing composition after it has been eluted from the chromatographic separation zone, wherein the weight ratio of any two soy proteins having a molecular weight of at least 50,000 daltons in the eluted treated soy protein-containing composition is within 20% of the weight ratio of the same two soy proteins in the food-grade soy protein-containing composition fed to the chromatographic separation zone.

3. The process as set forth in claim 2 wherein the food-grade soy protein-containing composition comprises a dispersion comprising a soy protein material and an aqueous medium.

4. The process as set forth in claim 3 wherein the food-grade soy protein-containing composition comprises a solution comprising an ultrafiltered dispersion comprising a soy protein material and an aqueous medium.

5. The process as set forth in claim 2 wherein the food-grade soy protein-containing composition has a pH of from 9 to 10.

6. The process as set forth in claim 5 wherein the food-grade soy protein-containing composition has a pH of 9.5.

7. The process as set forth in claim 2 wherein the treated soy protein-containing composition comprises no more than 500 ppm of low molecular weight components (i) having a molecular weight of from 80 to 17,000 daltons and (ii) which absorb ultraviolet radiation having a wavelength of from 200 to 400 nm.

8. The process as set forth in claim 7 wherein the treated soy protein-containing composition comprises no more than 350 ppm of the low molecular weight components.

9. The process as set forth in claim 8 wherein the treated soy protein-containing composition comprises no more than 200 ppm of the low molecular weight components.

10. The process as set forth in claim 2 wherein the treated soy protein-containing composition comprises no more than 150 ppb of volatile components selected from aldehydes having less than ten carbon atoms, ketones having less than ten carbon atoms, and combinations thereof.

11. The process as set forth in claim 10 wherein the treated soy protein-containing composition comprises no more than 100 ppb of the volatile components.

12. The process as set forth in claim 11 wherein the treated soy protein-containing composition comprises no more than 50 ppb of the volatile components.

13. The process as set forth in claim 2 wherein the treated soy protein-containing composition comprises no more than 200 ppm of isoflavones selected from the group consisting of daidzin, daidzein, genistin, genistein, glycitin, glycitein, malonyl esters of daidzin, malonyl esters of genistin, malonyl esters of glycitin, acetyl esters of daidzin, acetyl esters of genistin, acetyl esters of glycitin, and combinations thereof.

14. The process as set forth in claim 13 wherein treated soy protein-containing composition comprises no more then 100 ppm of the isoflavones.

15. The process as set forth in claim 14 wherein the treated soy protein-containing composition comprises no more than 90 ppm of the isoflavones.

16. The process as set forth in claim 15 wherein the treated soy protein-containing composition comprises no more than 80 ppm of the isoflavones.

17. The process as set forth in claim 16 wherein the treated soy protein-containing composition comprises no more than 50 ppm of the isoflavones.

18. The process as set forth in claim 17 wherein the treated soy protein-containing composition comprises no more than 25 ppm of the isoflavones.

19. The process as set forth in claim 18 wherein the treated soy protein-containing composition comprises no more than 15 ppm of the isoflavones.

20. The process as set forth in claim 2 wherein an aqueous mixture of the treated soy protein-containing composition has a whiteness index of at least 50 when the aqueous mixture has a soy protein content of 2 to 3% by weight and a pH of 6.8 to 7.2, wherein the whiteness index (WI) is determined using the equation WI=L−3b and L and b are determined using a colorimeter, L being a measure of the whiteness of the aqueous mixture with the value of L ranging from 0 to 100 with increasing whiteness and b being a measure of the presence of yellow or blue colors in the aqueous mixture, with positive b values indicating the presence of yellow colors and negative b values indicating the presence of blue colors.

21. The process as set forth in claim 20 wherein the aqueous mixture has a whiteness index of at least 60.

22. The process as set forth in claim 21 wherein the aqueous mixture has a whiteness index of at least 70.

23. The process as set forth in claim 20 wherein the aqueous mixture has a whiteness index of from 50 to 85.

24. The process as set forth in claim 23 wherein the aqueous mixture has a whiteness index of from 60 to 80.

25. The process as set forth in claim 24 wherein the aqueous mixture has a whiteness index of from 65 to 80.

26. The process as set forth in claim 25 wherein the aqueous mixture has a whiteness index of from 70 to 80.

27. The process as set forth in claim 20 wherein the aqueous mixture has an L value of less than 78.

28. The process as set forth in claim 27 wherein the aqueous mixture has an L value of less than 75.

29. The process as set forth in claim 28 wherein the aqueous mixture has an L value of less than 70.

30. The process as set forth in claim 2 the treated soy protein-containing composition comprises less than 0.2% by weight of each of a plurality of carbohydrates.

31. The process as set forth in claim 30 wherein the treated soy protein-containing composition comprises less than 0.2% by weight of each of fructose, glucose, sucrose, maltose, lactose, stachyose, and raffinose.

32. The process as set forth in claim 2 wherein the treated soy protein-containing composition has a substantially reduced green, grassy, beany, oily, fatty, tallow-like, or putty off flavor as compared an untreated soy protein-containing composition.

33. The process as set forth in claim 2 wherein the food-grade soy protein-containing composition comprises a soy protein material selected from the group consisting of soy flakes, soy flour, soy grits, soy meal, soy proteins extracted from whole soybeans, soy protein concentrates, and soy protein isolates.

* * * * *